United States Patent
Sakurai

[11] Patent Number: 5,678,516
[45] Date of Patent: Oct. 21, 1997

[54] ACCESSORY DRIVE ARRANGEMENT FOR ENGINE

[75] Inventor: Kenichi Sakurai, Iwata, Japan

[73] Assignee: Yamaha Hatsudoki Kabushiki Kaisha, Iwata, Japan

[21] Appl. No.: 679,733

[22] Filed: Jul. 12, 1996

[30] Foreign Application Priority Data

Jul. 18, 1995 [JP] Japan ..................... 7-181693

[51] Int. Cl.$^6$ ................................. F02B 77/00
[52] U.S. Cl. ..................... 123/198 R; 123/90.31
[58] Field of Search ............. 123/41.44, 198 R, 123/195 A, 90.27, 90.31, 192.2

[56] References Cited

U.S. PATENT DOCUMENTS 4,753,199  6/1988  Melde-Tuczai et al. ............ 123/90.31
5,099,945  3/1992  Okui et al. ........................ 123/90.31

*Primary Examiner*—Noah P. Kamen
*Attorney, Agent, or Firm*—Knobbe, Martens, Olson & Bear LLP

[57] ABSTRACT

An internal combustion engine having an improved accessory drive arrangement. A number of the engine accessories is driven off of an intermediate shaft that is driven from the crankshaft between its ends and which permits the driving of accessories at points on this intermediate shaft that are spaced inwardly from the ends of the crankshaft to provide a more compact assembly. This facilitates mounting of the engine in transverse engine fashion in the engine compartment of a motor vehicle since the accessory drives do not increase the overall length of the engine, particularly at its upper end.

12 Claims, 3 Drawing Sheets

ACCESSORY DRIVE ARRANGEMENT FOR ENGINE

BACKGROUND OF THE INVENTION

This invention relates to an internal combustion engine and more particularly to an improved and compact engine and accessory drive arrangement.

Internal combustion engines, in addition to having a number of mechanically driven auxiliaries which are required for the engine operation, such as camshafts, oil and water pumps and other devices, are also called upon to drive a number of accessories which may be utilized with an associated vehicle powered by the engine. This is particularly true in conjunction with the automotive applications wherein the engine also drives directly a number of auxiliaries for the vehicle, such as power steering pumps, air conditioning compressors, vacuum pumps, air pumps and the like. For the most part, these engine auxiliaries or accessories are driven by flexible transmitters.

The use of flexible transmitters over gear drives is generally preferred because of the lower noise generation for these types of drives. However, the use of flexible transmitter drives requires normally the drives to be positioned at the ends of the shafts which provide the driving force for the flexible transmitter and, specifically, the initial driving sprocket. Thus, these accessory drives are generally positioned at the ends of the engine and this has the effect of increasing the overall length of the engine. Where the engine is provided with overhead camshafts and, particularly, with the dual overhead cam (DHOC) engines, the auxiliary drives are generally positioned outwardly of the camshaft drives. This further exacerbates the problem of overall length of the engine.

In addition to increasing the length of the engine, these types of drive mechanisms frequently position the auxiliaries at an upper portion of the engine. This is done primarily so as to facilitate servicing of these auxiliaries. However, if the engine employs over head camshafts, then the auxiliary drives are also positioned outwardly of the camshaft drives and at the upper end of the engine. Hence, the length of the engine is increased and it is also increased in the upper area which is not particularly desirable.

This increase in upper engine length is particularly disadvantageous when the engine is utilized in an arrangement wherein it is mounted transversely in the engine compartment. This type of engine placement is frequently used so as to maintain relatively short vehicle lengths and for other spatial advantages. However, where the engine accessory drive is mounted in such a way as to increase the length at the upper portion of the engine, then such transverse mounting is significantly impeded. In addition, this increase in overall length reduces the number of cylinders which can be utilized in the engine and, thus, has many disadvantages.

It is, therefore, a principal object of this invention to provide an improved accessory drive arrangement for an engine.

It is a further object of this invention to provide an improved engine accessory drive arrangement wherein the accessory drive does not contribute to an increase in the overall length of the engine.

It is a yet further object of this invention to provide an improved and compact engine and engine accessory drive that facilitates utilization of the engine in transverse engine placements in motor vehicles.

SUMMARY OF THE INVENTION

This invention is adapted to be embodied in an internal combustion engine that is comprised of a cylinder block. A crankshaft is rotatably journaled relative to the cylinder block about a first axis that is disposed at a lower end of the cylinder block. A crankshaft damper is affixed to one end of the crankshaft and a flywheel is affixed to the other end of the crankshaft. A balance shaft is supported for rotation about a second axis that is parallel to the first axis. The balance shaft is driven directly from the crankshaft. An accessory drive element is affixed to one end of the balance shaft and its spaced inwardly from the ends of the crankshaft damper and flywheel between the ends of the engine. An accessory is driven from the accessory drive element of the balance shaft.

DETAILED DESCRIPTION OF THE PREFERRED EMBODIMENTS OF THE INVENTION

Figure 1:
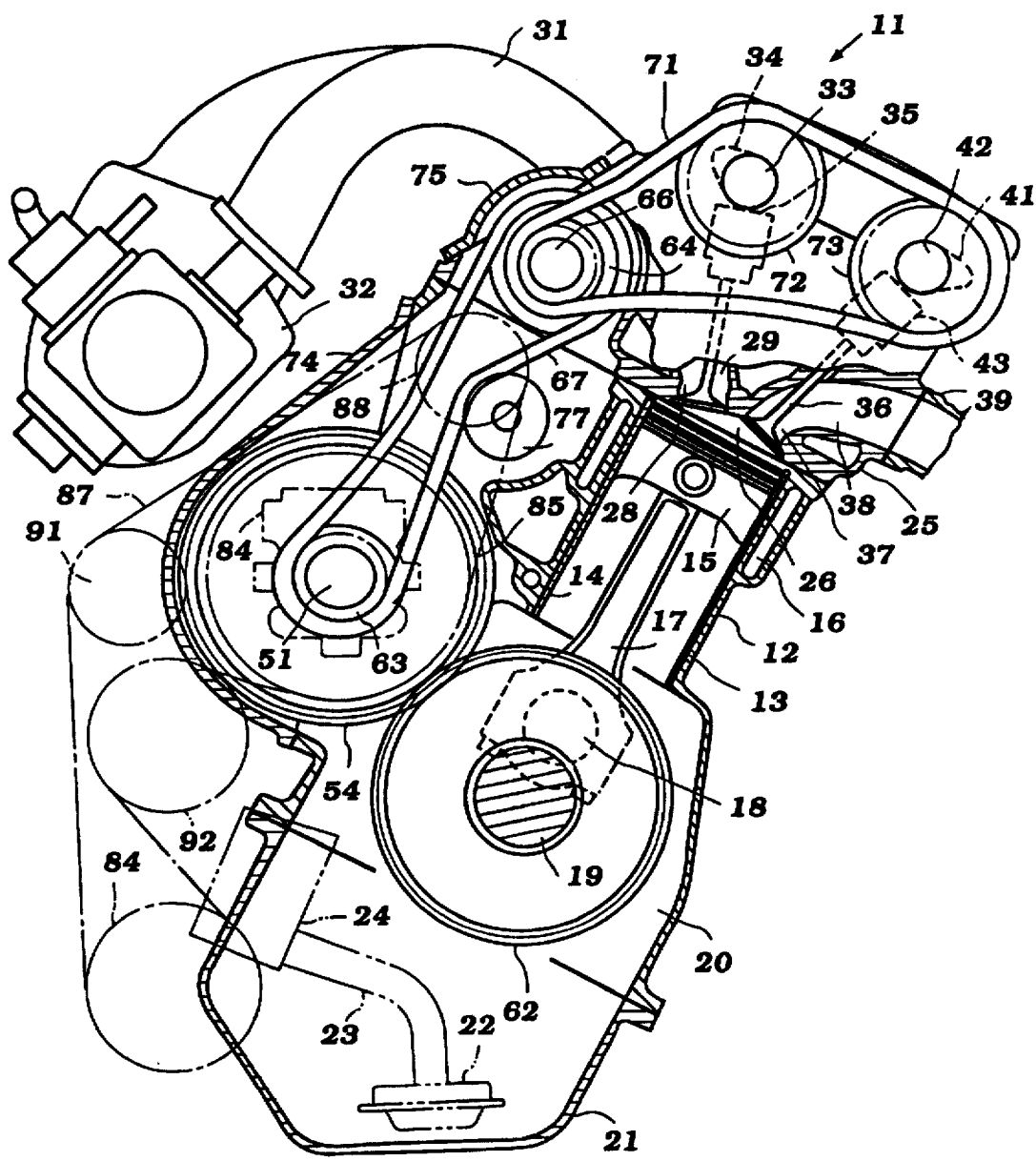
FIG. 1 is a side elevational view of an engine constructed in accordance with an embodiment of the invention with portions of the engine's outer surface removed to illustrate various internal components and the accessory drive arrangement for the engine.

Referring now to the drawings and initially to FIG. 1, an internal combustion engine constructed in accordance with an embodiment of the invention is indicated generally by the reference numeral 11. In the illustrated embodiment, the engine 11 is depicted as being of the five-cylinder, in-line, four-stroke type though it is to be understood that the invention may also be practiced in conjunction with engines of other configurations. The engine 11 is configured so as to facilitate its use as a propulsion trait for motor vehicles such as an automobile. Particularly the engine 11 is configured for use in a transverse positioning in the engine compartment, although its use is not so limited. However the compact construction of the engine facilitates such applications even though the engine 11 is capable of having more cylinders than normally possible in such transverse engine orientations.

The engine 11 is comprised of a cylinder block 12 which may be formed of a lightweight material such as cast aluminum alloy and includes cylindrical openings in which are press-fitted sleeves 13 that define cylinder bores 14 in which pistons 15 reciprocate. The cylinder bore axes define a plane that is inclined rearwardly from vertical. As such, the cylinder block 12 slants rearwardly.

The engine 11 is water cooled. For this reason, a plurality of water jackets 16 are disposed adjacent to the cylinder bores 14 so as to cool the engine 11. The pistons 15 are pivotally connected to the small ends of respective connecting rods 17, whose big ends are rotatably journaled about the throw 18 of a crankshaft 19. The crankshaft 19 is rotatably journaled by any suitable means within a crankcase 20. The construction of the crankshaft 19 will be discussed in detail later.

The crankcase 20 is defined by the lower end of the cylinder block 12 and a lower crankcase member 21 which serves the oil pan for the engine 12 and is affixed to the cylinder block 12 by any suitable means. A strainer 22 is disposed within the lower end of the oil pan 21 and communicates through a conduit 23 with an oil pump 24 which pumps lubricating oil throughout the engine 11, as is well known in the art.

A cylinder head is indicated by the reference numeral 25 and affixed to the top of the cylinder block 12 in a known manner. The cylinder head 25 has individual recesses 26 that cooperate with the cylinder bores 14 and pistons 15 to define the engine combustion chambers. Intake valves 27 are slidably supported in the cylinder head 25 and control intake ports 28 that cooperate with the inner ends of intake passages 29 formed in the cylinder head 25. The outer ends of the intake passages 29 terminate at an intake manifold 31, which delivers a supply of atmospheric air and fuel from an induction and charge former 32 to the combustion chambers 26. The induction and charge former 32 mixes a supply of atmospheric air with fuel from a fuel tank (not shown) at a stoichiometric ratio suitable for combustion. The amount of air-fuel charge delivered to the combustion chambers 26 by the induction and charge former 32 is regulated by a throttle valve (not shown).

An overhead intake camshaft 33 is rotatably journaled within the cylinder head 25 and includes lobe portions 34 for operating the intake valves 27 through tappets 35. The intake camshaft 33 is driven in a manner which will be described in detail later.

Exhaust valves 36 are slidably supported in the cylinder head 25 and control the flow of exhaust gases from the combustion chambers 26 through exhaust ports 37 and into exhaust passages 38. The exhaust passages 38 cooperate with an exhaust manifold 39 and exhaust system (not shown) for discharging the exhaust gases from the engine 11 to the atmosphere and for silencing these discharge gases. The exhaust valves 36 are operated on by the lobes 41 of an overhead exhaust camshaft 42 through tappets 43 and journaled within the cylinder head 25 and driven in a manner to be described in detail later.

The crankshaft 19 will now be described with additional reference to FIG. 2. The crankshaft 19 is rotatably journaled within the crankcase 20 and rotates about a first axis, namely, its own longitudinal axis. This rotation drives a flywheel (not shown) that is affixed to the rear end of the crankshaft 19 and whose inertia assists in the smooth operation of the engine at low engine speeds. This end of the engine is refereed to as the "rear end" even though the engine 11 is disposed transversely in the illustrated embodiment. In a longitudinal arrangement this end would normally be the rear end. The flywheel is also associated with a transmission (not shown) for driving a vehicle powered by the engine 11. A crankshaft damper 44 is affixed to the front end of the crankshaft 19 by a bolt 45 and reduces the torsional vibrations of the crankshaft 19 about the first axis. These vibrations are caused by the downward motions of the pistons 15 and connecting rods 17 during the expansion strokes for the respective cylinder bores 14.

The crankshaft 19 is provided with five throws 18 which cooperate with the respective cylinder bores 14. The throws 18 are connected to the central shaft 46 of the crankshaft 19 by cheek portions 47 which are associated in pairs with each of the throws 18. The throws 18 are offset from the longitudinal axis of the crankshaft 19, and thus their associated pistons 15 and connecting rods 17 exert outwardly directed forces at each of their associated central shafts 46 when the crankshaft 19 is rotating. These forces are balanced by counterweights that are indicated by the reference numeral 48 and are formed on the ends of the cheeks 43 opposite of the ends to which the throws 18 are affixed. It should be noted, however, that no counterweights 48 are associated with the cheeks of the second cylinder bore 14 from the flywheel, and that only a single counterweight 48 is associated with the cheeks 47 of the cylinder bore 14 that is adjacent to the damper 85. Thus, the crankshaft 19 is not completely balanced.

It is well known in the art that additional balancing means are also necessary in order to adequately balance engines that have a certain number of cylinders, such as three or five cylinders. A balancer is frequently employed as the balancing means and is usually positioned underneath the crankshaft and inside the crankcase member. This location for the balancer, however, increases the overall height of the engine and may cause packaging problems for the vehicle which is driven by the engine. It is desirable therefore to utilize a balancer shaft arrangement where the balancer is positioned in a manner that does not increase the height of the engine while still providing an overall compact assembly. This is accomplished by disposing the balancer forwardly of the engine.

Figure 2:
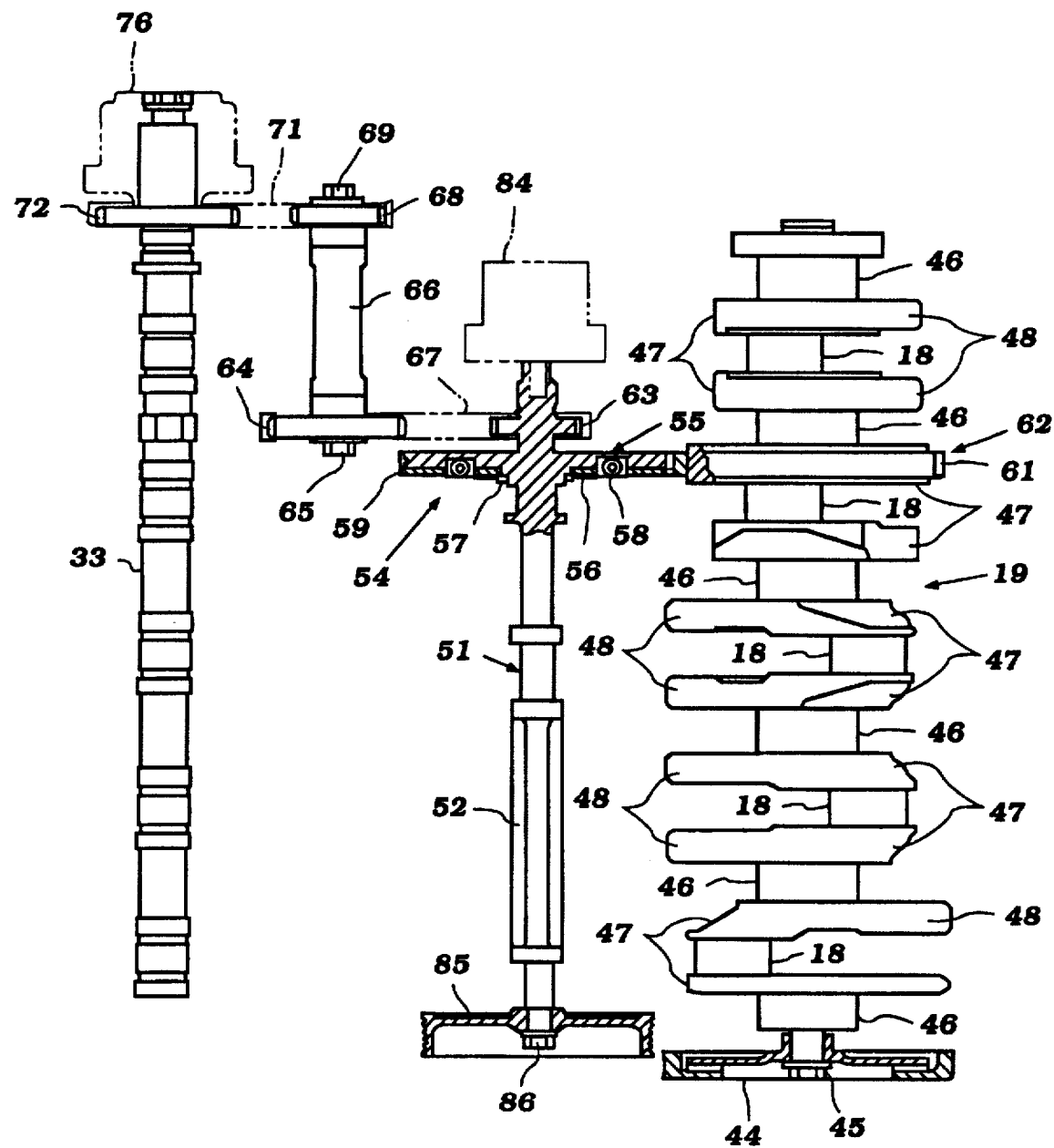
FIG. 2 is a top plan view of the accessory drive means with portions of the crankshaft and intermediate shaft shown in cross section.

With continued reference to FIGS. 1 and 2, an intermediate shaft is utilized as a balancer and indicated by the reference numeral 51 and rotatably journaled about a second axis, namely, its longitudinal axis, within the engine block 12. This second axis is parallel to and offset forwardly and upwardly from the first axis of the crankshaft 19 and, along with the first axis, defines a plane that is disposed forwardly of and at some acute angle to the plane defined by the cylinder bores 14. The balancer shaft 51 includes a front end eccentric balancing mass 52 which serves as the means by which any engine vibration that is not balanced by counterweights 48 is balanced. The operation of the eccentric mass 52 will be discussed later.

The balancer 51 is driven from the crankshaft 19 by means of a direct gear drive 54 and includes a gear assembly 55 that is integrally formed with the balancer 51. A sub-gear 56 is held in association with the gear 55 by a retainer 57 and has limited relative rotation to the gear 55 about the second axis. This rotation is controlled by a biasing spring 58 which acts between the gear 55 and sub-gear 56, both of which are additionally provided with teeth 59 in one-to-one correspondence which extend about their outer circumference. The springs 58 tend to rotate the sub-gear 56 such that its teeth 59 can shift in alignment with those of the gear 55 to take up any lash in the direct gear drive 54. As will be seen below, this misalignment acts as an anti-backlash coupling which improves and silences the operation of the balancer 51.

The teeth 59 of the balancer gear assembly 55 mesh with and are driven by the teeth 61 of a crankshaft drive gear 62 that comprises one of the cheeks 47 of the crankshaft 19 that is associated with the throw 18 of the second cylinder bore 14 and thus spaced inwardly from the ends of the crankshaft 19.

It has been noted that this throw 18 has no counterweights. The gear 55, however, has a cutout portion (not shown) so that it too is unbalanced. This unbalanced mass thus balances for the unbalance of the driving throw 18 of the crankshaft 19. Thus, with additional reference now to FIG. 3, the crankshaft 19 which rotates counterclockwise, as indicated by the arrow a, drives the balancer 51 in the clockwise direction indicated by the arrow b. This clockwise rotation of the balancer 51 causes the eccentric mass 52 to generate forces that are equal to the remaining unbalanced forces generated by the crankshaft 19, but act in the opposite direction. These forces thus cancel each other out, meaning that the balancer 51 effectively balances the engine 11.

With conventional engines it is the practice to utilize the engine to drive a number of accessories which may be required for engine operation or which may be utilized with the vehicle powered by the engine. These accessories are typically driven off of one end of the engine, and thus tend to increase the overall length of the engine. This increase in length is especially undesirable for those associated motor vehicles in which the engine is mounted transversely across the vehicle. It is desirable therefore to utilize an engine configuration where the accessories are driven by a means associated with the engine that in no way adds to the length of the engine. An embodiment of this invention accomplishes this by additionally utilizing the balancer to drive the accessories in a manner which allows for the mounting of the accessories to the engine at locations that in no way add to the length of the engine.

With reference to FIG. 2, the balancer 51 includes a camshaft drive sprocket 63 that is integrally formed with the balancer 51 adjacent to the balancer gear 54 and is thus disposed inwardly relative to the ends of the crankshaft 19. The drive sprocket 63 drives a further sprocket 64 that is affixed by a bolt 65 to one end of a cam driving shaft 66 through a first flexible transmitter drive 67. The cam driving shaft 66 is rotatably journaled within the cylinder head 25. A further sprocket 68 is affixed by a bolt 69 to the other end of the cam driving shaft 66 and drives a second flexible transmitter device 71, which in turn drives sprockets 72 and 73 that are associated with the overhead camshafts 33 and 42, respectively. Thus, the overhead camshafts 33 and 42 are driven by a camshaft drive arrangement that is disposed entirely forwardly of the engine 12 in a compact manner that does not add to the length of the engine 11. This arrangement is covered by covers 74 and 75, which are affixed by any suitable means to the engine block 12 and cylinder head 25, respectively.

It should be noted at this time that the camshaft sprockets 72 and 73 drive the camshafts 33 and 42 through a variable valve timing mechanism 76, shown in phantom in FIG. 2. This variable valve timing mechanism 76 allows the cam timing to be modified so as to provide optimum engine performance under a variety of engine running conditions.

Figure 3:
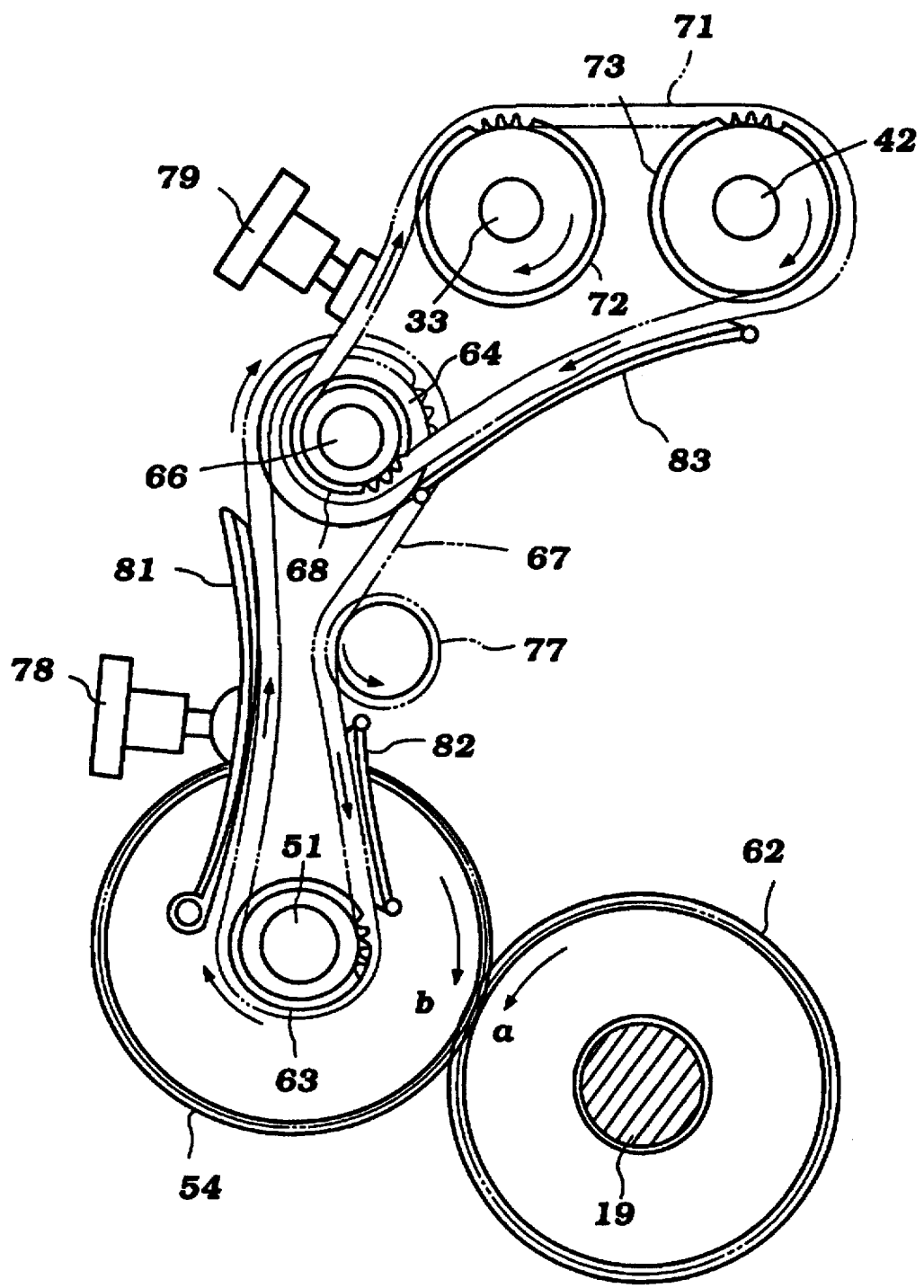
FIG. 3 is a side elevational view of the accessory drive arrangement.

In addition to driving the cam driving shaft 66, the first flexible transmitter drive 67 also drives a water pump 77 which pumps water to the water jackets 16 and is affixed to the front of the engine above the plane defined by the first and second axes and forward of the plane defined by the cylinder bores 14 and in engagement with the outer peripheral surface of the first flexible transmitter drive 67, as is seen in FIG. 3.

It is also seen in FIG. 3 that a pair of adjustable, flexible transmitter tensioners 78 and 79 are associated with the first and second flexible transmitter drives 67 and 71, respectively. The first tensioner 78 is associated with the first flexible transmitter drive 67 and operates a tension rail 81 that is pivotally connected at one end to the engine block 12 on the side of the transmitter drive 67 that is opposite of the water pump 77. A guide rail 82 is also associated with the transmitter drive 67 adjacent to the water pump 77. The second tensioner 79 acts directly against the outer periphery of the second flexible transmitter drive 71 above the cam driving shaft 66. A guide rail 83 is also associated with the second flexible transmitter drive 71.

The balancer 51 is also used to drive a plurality of additional engine and other accessories. A power steering pump is indicated by the reference numeral 84 and is directly driven off of the rearward end of the balancer 51. A second accessory drive mechanism is composed of a pulley 85 that is affixed to the forward end of the balancer 51 by a bolt 86. The pulley 85 drives a serpentine belt 87 which transmits drive to a number of pulleys associated with various engine and other accessories. An alternator 88 is affixed to the lower front face of the engine block 12, forward of the plane defined by the cylinder bores 14 and above the plane defined by the first and second axes, and driven off of the belt 87, as is an air compressor 89 that is affixed to the lower forward portion of the crankcase member 21 beneath the plane defined by the first and second axes. An idler pulley 91 is associated with the belt 87 above the air compressor 89 and utilized to provide clearance for the belt 87 from the engine 11. A torsion pulley 92 is also affixed to the engine 11 between the air compressor 89 and idler 91, and maintains proper torsion in the belt 87.

It should be readily apparent that the above engine provides a compact arrangement whereby the engine and other accessories are driven off of the crankshaft in a manner that does not add to the length of the engine. Of course, the foregoing description is that of preferred embodiments of the invention, and various changes and modifications may be made without departing from the spirit and scope of the invention, as defined by the appended claims.

What is claimed is:

1. An internal combustion engine comprised of a cylinder block, a crankshaft rotatably journaled relative to said cylinder block about a first axis that is disposed at a lower end of said cylinder block, a crankshaft damper affixed to one end of said crankshaft, a flywheel affixed to the other end of said crankshaft, a balance shaft supported for rotation about a second axis that is parallel to said first axis, means for driving said balance shaft directly from said crankshaft, an accessory drive element affixed to one end of said balance shaft and spaced inwardly between said crankshaft damper and said flywheel and between the ends of said engine, and an accessory driven by said accessory drive element.

2. An internal combustion engine as set forth in claim 1, wherein the accessory is disposed at a side of the engine and spaced inwardly from the ends of the engine.

3. An internal combustion engine as set forth claim 1, further including a second accessory drive affixed to the other end of the balance shaft.

4. An internal combustion engine as set forth in claim 1, wherein the balancing mass is positioned proximate to one end of the balance shaft.

5. An internal combustion engine as set forth in claim 4, wherein the accessory drive element is spaced from the balancer mass.

6. An internal combustion engine as set forth in claim 5, further including means for driving an additional accessory directly from the intermediate shaft at the other end of the intermediate shaft.

7. An internal combustion engine as set forth in claim 1, wherein a plurality of aligned cylinder bores are formed in the cylinder block and wherein the crankshaft has a plurality of throws each associated with a respective piston in a respective one of said cylinder bores.

8. An internal combustion engine as set forth in claim 7, wherein the balance shaft is driven from the crankshaft at a point between two of the cylinder bores and spaced inwardly from the ends of the crankshaft.

9. An internal combustion engine as set forth in claim 8, wherein the balancing mass is proximate to one end of the balance shaft.

10. An internal combustion engine as set forth in claim 9, wherein the accessory drive element is disposed at the end of the balance shaft spaced from the balancer mass.

11. An internal combustion engine as set forth in claim 10, further including means for driving an additional accessory directly from the balance shaft at the other end of the balance shaft.

12. An internal combustion engine comprised of a cylinder block, a crankshaft rotatably journaled relative to said cylinder block about a first axis that is disposed at a lower end of said cylinder block, a camshaft journaled for rotation about a second axis parallel to said first axis and disposed at the end of said cylinder block opposite said first axis, a crankshaft damper affixed to one end of said crankshaft, a flywheel affixed to the other end of said crankshaft, an intermediate shaft supported for rotation about a third axis that is parallel to said first and said second axes and spaced therefrom, means for driving said intermediate shaft directly from said crankshaft, a first drive for driving said intermediate shaft from said crankshaft, a second drive for driving said camshaft from said intermediate shaft, an accessory drive element affixed to one end of said intermediate shaft and spaced between said crankshaft damper and said flywheel and between the ends of said engine, and an accessory driven by said accessory drive element.

* * * * *